July 27, 1965 W. SIEPMANN 3,197,175
SLUICE VALVE HOUSING CONSISTING OF SEVERAL
SHAPED PARTS WELDED TOGETHER
Filed March 29, 1963 2 Sheets-Sheet 2

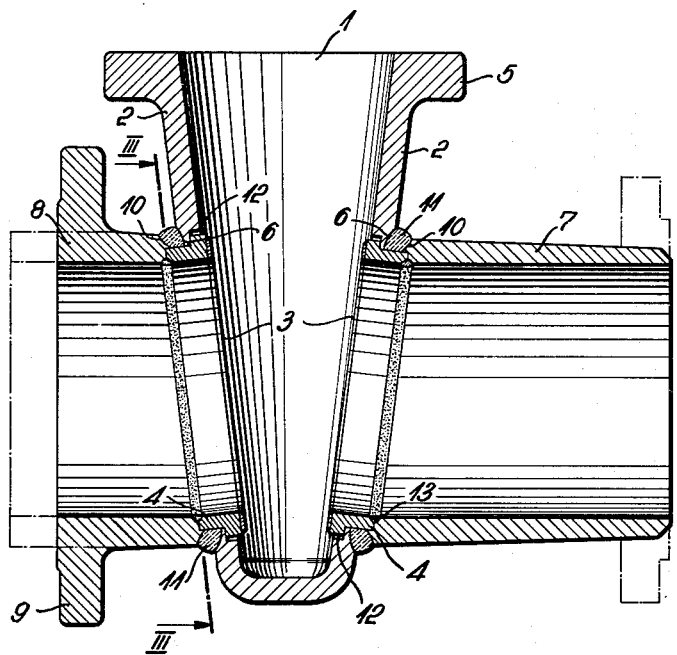
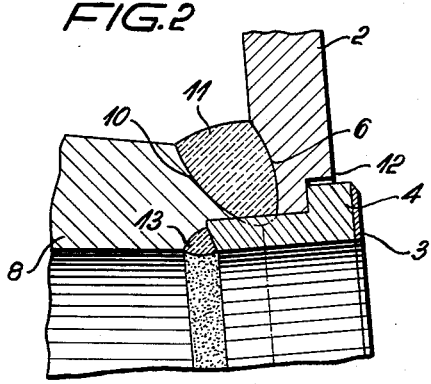
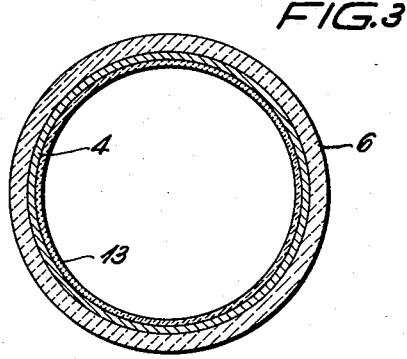

INVENTOR
Walter Siepmann
BY
MICHAEL S. STRIKER
his ATTORNEY

— 1 —

3,197,175
SLUICE VALVE HOUSING CONSISTING OF SEVERAL SHAPED PARTS WELDED TOGETHER
Walter Siepmann, Belecke (Mohne), Germany, assignor to Stahl-Armaturen Siepmann G.m.b.H., KG, Belecke (Mohne), Germany
Filed Mar. 29, 1963, Ser. No. 269,080
Claims priority, application Germany, Apr. 4, 1962, St 19,048
6 Claims. (Cl. 251—328)

This invention relates to sluice valve housings which consist of several parts welded together, flanges and connection pieces of different shape being weldable to substantially annular outer connection surfaces of a central housing part of standard construction for different types of connection and particularly forged in one piece and slide guide rings being inserted and secured in prepared annular grooves in the central housing part.

The central housing part and/or the flanges and connection pieces may also be manufactured as cast-steel parts. The division of the sluice valve housing into the central housing part and the flanges and connection pieces serving for the connection of the sluice valve housing in pipe conduits is chosen for reasons of an economical production so that the central housing parts having a single basic form can be mass-produced and the sluice valve housings be made by connecting the central housing parts to flanges or connection pieces conforming to different standards, said sluice valve housings being adapted for direct connection in a pipe conduit by welding or flanging. Sluice valve housings of this construction are equpped in some cases with screwed-in slide guide rings of plain or stainless steel which can be drop-forged as so-called block rings and provided with a stellite shielding. Such rings are readily exchangeable. The inserted, particularly screwed-in, rings require a good fitting and a close mounting. Furthermore, it is desirable to be able to manufacture the sluice valve housings by corresponding shaping and operational methods on automatic machines, e.g. transfer trains, in one setting starting with an unworked piece and ending with a housing ready for mounting.

These requirements stated above are not yet sufficiently met by the known forms of construction.

An essential improvement in the manufacture of a sluice valve housing of the type specified at the beginning is achieved according to the invention by the provision of a sluice valve housing which comprises several shaped parts welded together and consisting of a central housing part and connection pieces connected thereto, said central housing part having inclined walls and being of standard construction for different types of connection, prepared annular grooves in said central housing part, slide guide rings inserted and secured in said annular grooves and providing valve seats, and outer substantially annular connection surfaces on said central housing part arranged substantially in the planes of the outer surfaces of said inclined walls of said central housing part and in a plane directed substantially parallel to the respective neighboring valve seat, said connection pieces being joined to said annular connection surfaces on said central housing part by means of annular welding seams constituting bearing surfaces for outer surface regions of said slide guide rings.

The annular welding seams may constitute bearing surfaces for the rear and/or peripheral surfaces of the slide guide rings.

The end faces of the adjoining flanges or connection pieces are inclined in a corresponding manner so that annular welding seams are formed which extend in the slanting plane of the walls of the central housing part and are mechanically produced in a known manner by shielded arc welding or by using powder.

At the first glance it may appear from this particular position of the welding seams that it must render the manufacture of the sluice valve housing difficult and uneconomical. In fact, this structural design first appearing to be abnormal, involves, however, considerable advantages. Firstly, the unequal and considerable amounts of excess material necessary in the known forms of construction when forging can be completely avoided. If amounts of excess material must be provided in dependence on the accurate position of the welding seams, these can now be kept small so that the engraving worked into the tools readily and uniformly fills when forging and also no high manufacturing costs are incurred upon subsequent reworking.

A further essential advantage consists in that a simple and reliable close mounting of the slide guide rings can be obtained. The welding seams are expediently made of stainless steel and also the slide guide rings may consist of a corresponding stainless steel which has been forged. Owing to the arrangement of the welding seams in regions engaged by the slide guide rings, corrosion-resistant bearing surfaces of the welding seams come into contact with those of the rings so that a satisfactory seal is ensured for a practically unlimited period of time. The rings may be screwed in place by means of threads; however, they may also be secured in position with the aid of welding seams.

An advantageous form of construction of the invention is characterized in that the central housing part is in the form of a cup-shaped member, the inclined walls of the central housing part are of even configuration and face the connection pieces, apertures are provided in said walls and the annular connection surfaces are of chamfered design and turned out in the region of said apertures. Such a central housing part which has no projections but only even wall surfaces can be forged particularly well. The apertures are worked out by gas cutting or turning. After the chamfered connection surfaces have been produced on the central housing part and the connection pieces by turning, the parts are welded together. The welding seams extend in part even into the housing wall. In this case, root portions of the welding seams may be turned off and this is done without additional expenditure of energy simultaneously with the turning of the annular grooves for the slide guide rings. In the case of rings having no threads, end faces of the rings are tightly joined to the bearing surfaces of the connection pieces by means of small welding seams.

An advantageous improvement in the manufacture of such a sluice valve housing is characterized in that the annular grooves are prepared in the central housing part and in the connection pieces, the slide guide rings are inserted as centering elements in the annular grooves and the annular welding seams are welded on said rings. In this case the annular grooves are formed prior to the welding together. The rings having the function of centering are tightly welded to the annular welding seams. A further tight weld at the rear end faces of the rings is dispensed with.

Two preferred embodiments of the invention will now be described by way of example and with reference to the accompanying drawings, in which:

FIG. 1 is a longitudinal central section through a sluice valve housing according to the invention;

FIG. 2 is a similar view, on a larger scale, of the connecting region of the central housing part, one connection piece and one slide guide ring;

FIG. 3 is a section taken on the line III—III of FIG. 1;

Figure 4:
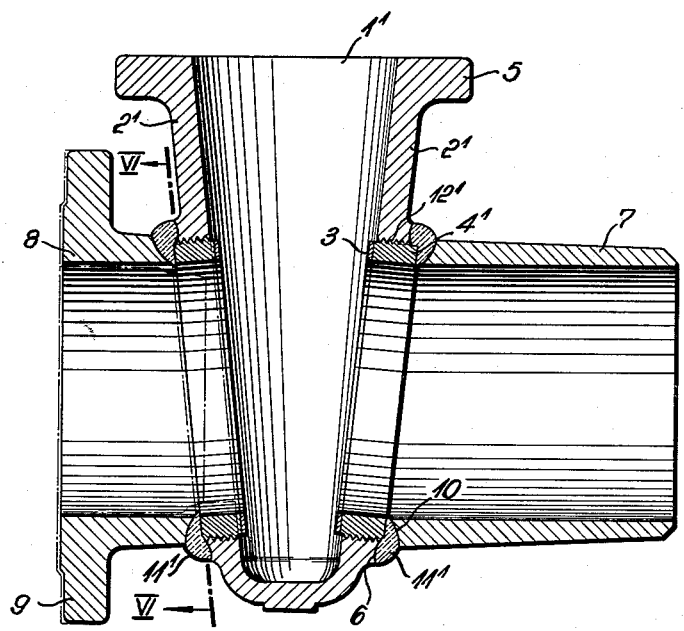
FIG. 4 is a view similar to FIG. 1 of a second embodiment of the sluice valve housing.

Referring to the drawings, a complete sluice valve housing according to the invention consists of a central housing part 1 having connection pieces 7 and 8 welded to two sides thereof, the connection piece 8 consisting of a short cylindrical section having a flange 9. The connection pieces 7 and 8 are joined to the inclined outer sides of the central housing part 1 by means of annular welding seams 11.

In the embodiment shown in FIGS. 1 to 3, the central housing part 1 is constructed as a cup-shaped member having even walls 2 which are arranged at an incline relative to each other. The inclination of the walls 2 is directed parallel to valve seats 3 provided on slide guide rings 4 manufactured from forged steel. Apertures corresponding substantially to the passage cross section, are worked out of the side walls of the cup-shaped member by gas cutting or turning. This form of the central housing part 1 has a flange 5 in its upper end region and is particularly suitable for drop forging in a one-part die block. Housing parts having flanges or connection pieces thereon require splittable die blocks which must be associated with corresponding clamping devices.

Chamfered connection surfaces 6 are produced in the region of the lateral apertures by turning. A chamfered connection surface 10 is also produced on the connection piece 7 and the short cylindrical section 8 having the flange 9. These chamfered connection surfaces 6 and 10 substantially determine the shape of the welding seam 11. This welding seam 11 extends in a plane parallel to the side wall 2 of the central housing part 1, i.e. parallel to the plane of the valve seat 3. It is self-evident that either connection pieces 7 or short cylindrical sections 8 having flanges 9 may be provided on both sides of the central housing part (see dot and dash lines in FIG. 1).

For securing the slide guide ring 4, an appropriately stepped annular groove 12 for receiving the ring 4 is produced by turning after the welding seam 11 has been filled. Simultaneously the root portion of the welding seam 11 is removed. The ring 4 is tightly welded at its rear end face to the connection piece 7 and the short cylindrical section 8, respectively, by means of a small circumferential seam 13. If necessary, the ring 4 and the annular groove 12 may be provided with threads so that the ring 4 is capable of being screwed in place.

Another advantageous manufacturing method is rendered possible by working, especially turning, the annular groove 12 for the ring 4 out of the wall 2 of the central housing part 1 and the end regions of the connection piece 7 and the short cylindrical section 8, respectively, prior to the welding together. The rings 4 are then used as support for the welding seam and serve at the same time for centering when clamping the housing parts together. After the annular seam 11 has been welded, the central housing part 1, the connection piece 7, the flanged short cylindrical section 8 and the rings 4 are firmly joined together. In this case, the provision of a tight weld between the rear end face of the ring 4 and the adjoining end faces of the walls of the connection piece 7 and the short cylindrical section 8, respectively, may be dispensed with.

Figure 6:
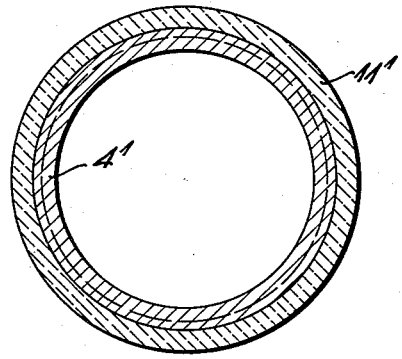
FIG. 6 is a section taken on the line VI—VI of FIG. 4.
Figure 5:
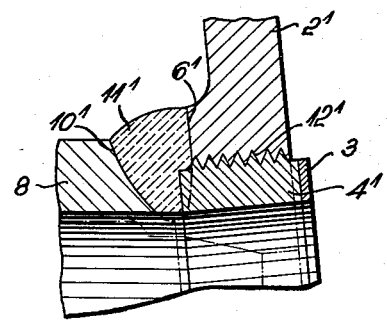
FIG. 5 is a view similar to FIG. 2 of the connecting region of the central housing part, one connection piece and one slide guide ring of the embodiment of FIG. 4.

In the embodiment shown in FIGS. 4 to 6, a welding seam $11^1$ is provided in the region of the rear end face of the ring $4^1$. The rings $4^1$ are screwed with external threads into corresponding annular grooves $12^1$ having internal threads. The central housing part $1^1$ is forged in one piece and provided on the exterior of its inclined walls $2^1$ with short beads or projections which, however, may also be omitted. When forging these very short beads or projections forming the chamfered connection surfaces on the walls of the central housing part, the lateral apertures will be formed at the same time. Within this aperture there is left a small amount of excess material as shown by dot and dash lines in FIGS. 4 and 5 which is given a constant cross section in circumferential direction. Low beads are also provided on the connection piece 7 and the short cylindrical section 8, which beads substantially close at the bottom the welding seam defined by the chamfered connection surfaces $6^1$ and $10^1$. After the welding seams have been filled, the aforementioned beads are removed, particularly by turning off, and also the annular groove $12^1$ for receiving the ring $4^1$ is turned out and furthermore, the thread cut. The annular groove $12^1$ extends into the welding seam $11^1$ and is limited by the welding seam. As can be seen from FIG. 5, the root portion of the welding seam $11^1$ is turned off and bearing surfaces are provided for the ring $4^1$ within the welding seam.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A sluice valve housing comprising, in combination, a cup-shaped central housing part having substantially flat opposite side walls inclined at an acute angle with respect to each other, each of said side walls having an opening therethrough defining an annular surface having an axis normal to the plane of the respective side wall; a slide guide ring coaxially arranged in each of said openings and having a peripheral surface in tight engagement with said annular surface of the opening in the respective side walls, each of said slide guide rings having parallel end faces, the inner end faces of the rings in the openings in the opposite side walls being located inwardly of the inner surfaces of said side walls and forming a valve seat; a tubular connecting member at each opening and forming a continuation of the responsive slide guide ring, said tubular connecting member having an annular end face facing an annular outer surface portion about the opening in the respective side wall and forming therewith an annular groove of substantially V-shaped cross section extending at least up to the opening in the respective side wall and substantially parallel to the plane thereof; and welding material filling said groove and forming a substantially V-shaped weld seam connecting said tubular connecting member to the respective side wall, each weld seam having a smooth annular face in sealing engagement with a corresponding annular face portion of the respective slide guide ring.

2. A sluice valve housing as set forth in claim 1, wherein each of said weld seams and each of said slide guide rings is made from stainless steel.

3. A sluice valve housing as set forth in claim 1, wherein said smoother annular face of said weld seam in a cylindrical face in the region of the root of the V- shaped seam and engages a peripheral annular surface portion of the respective slide guide ring.

4. A sluice valve housing as set forth in claim 3 and including an additional V-shaped weld seam for each slide guide ring and connecting the outer end face of each slide guide ring to the respective tubular connecting member.

5. A sluice valve housing as set forth in claim 1, wherein said smooth annular face of said weld seam abuts against the outer end face of the respective slide guide ring.

6. A sluice valve housing as set forth in claim 5, wherein the annular surface of each opening is formed with an inner screw thread engaging into a corresponding outer screw thread in the slide guide ring extending through the opening.

References Cited by the Examiner

UNITED STATES PATENTS

| | | | |
|---|---|---|---|
| 1,598,244 | 8/26 | Crook | 251—329 |
| 2,347,676 | 5/44 | Eplett | 251—366 |
| 3,002,525 | 10/61 | Grove | 251—368 XR |

FOREIGN PATENTS 1,118,775  3/56  France.

M. CARY NELSON, *Primary Examiner*.

LAVERNE D. GEIGER, *Examiner*.